United States Patent [19]

Martin et al.

[11] 3,953,342

[45] Apr. 27, 1976

[54] PETROLEUM RECOVERY PROCESS

[75] Inventors: Fred David Martin; Lawrence James Guilbault, both of McMurray, Pa.

[73] Assignee: Calgon Corporation, Pittsburgh, Pa.

[22] Filed: May 8, 1974

[21] Appl. No.: 468,036

[52] U.S. Cl. ............................ 252/8.55 D; 166/274; 166/275
[51] Int. Cl.² .................... E21B 43/20; E21B 43/22
[58] Field of Search ...................... 252/8.55 D, 188; 166/273, 274, 275

[56] References Cited
UNITED STATES PATENTS

| | | | |
|---|---|---|---|
| 2,801,216 | 7/1957 | Yoder et al. | 210/64 |
| 3,085,063 | 4/1963 | Turbak | 252/8.55 |
| 3,106,525 | 10/1963 | Schmid et al. | 252/8.55 X |
| 3,343,601 | 9/1967 | Pye | 166/275 X |
| 3,679,000 | 7/1972 | Kaufman | 252/8.55 X |
| 3,800,877 | 4/1974 | Knight | 166/274 X |
| 3,850,244 | 11/1974 | Rhudy et al. | 166/273 |

OTHER PUBLICATIONS

The Condensed Chemical Dictionary, Seventh Edition, Rec. 1-23-67, p. 456.

*Primary Examiner*—Herbert B. Guynn
*Attorney, Agent, or Firm*—Rudolph J. Anderson; Harry E. Westlake; Martin L. Katz

[57] ABSTRACT

Use of dialdehydes to maintain or increase solution viscosity of polymer compositions useful in oil recovery processes. In particular, the dialdehydes are used to maintain or enhance the effectiveness of polymers used as viscosity increasing agents in aqueous oil displacement media in the secondary and tertiary recovery of oil.

3 Claims, No Drawings

PETROLEUM RECOVERY PROCESS

This invention relates to the recovery of petroleum from subterranean oil-bearing formations.

More particularly, this invention relates to a waterflooding process employing as the flooding medium an aqueous solution of a dialdehyde and a water-soluble polymer.

In the secondary and tertiary recovery of petroleum by water flooding, it has been proposed to employ aqueous media rendered more viscous than ordinary water or brine by the incorporation therein of water-soluble agents such as high molecular weight, water-soluble polymers. However, many polymers when in aqueous solutions undergo molecular weight breakdown or degradation. Diluted polymer solutions are more susceptible to degradation than solutions of higher concentration of the polymer. The degradation is particularly rapid when the solution is kept at an elevated temperature or a medium containing substantial amounts of oxygen. This degradation results in substantial reductions in the solution viscosity.

Various chemicals have heretofore been added to polymers in order to prevent their degradation. For example, U.S. Pat. No. 3,085,063 discloses the use of formaldehyde to minimize viscosity loss in polymeric waterflooding solutions, U.S. Pat. No. 3,343,601 discloses the use of sodium hydrosulfite and sodium sulfite to prevent polymer degradation, U.S. Pat. No. 3,747,676 discloses the use of formaldehyde to maintain the solution viscosity of unhydrolyzed polyacrylamide and U.S. Pat. No. 3,753,939 discloses the use of thiosulfates to improve the stability of polymers against thermal and oxidative degradation. In addition, U.S. Pat. No. 3,772,407 discloses a class of glyoxal substituted vinyl alcohol-acrylamide graft copolymers.

Many of these known additives, however, have not been entirely satisfactory in stabilizing polymeric solutions. For example, in certain instances these additives adversely affect other properties of the polymers.

Accordingly, it is an object of this invention to provide a polymer flooding process in which the effectiveness of the polymer is maintained or enhanced under operating conditions.

It is a further object of this invention to provide a polymer flooding process which increases the recovery of petroleum from a subterranean reservoir.

These and other objects of this invention are accomplished by the process of this invention in which aqueous solutions of a dialdehyde and a water-soluble polymer are introduced through an injection well, or wells, into an oil-bearing formation. The displaced oil is then recovered at one or more producing wells spaced from the injection wells. Aqueous liquids that may be employed to prepare the injection fluids include fresh water, oil field brines, ocean water and, in general, any aqueous fluid which may be available at the oil field site for practice of the invention.

Water-soluble, polymeric mobility control agents often employed include the acrylic amide polymers such as homopolymers of acrylamide and copolymers thereof with acrylic acid, methacrylic acid, alkali-metal salts of such acids and other classes of polymeric mobility control agents include the water-soluble, alkylene oxide polymers, polymer sulfonates, polyvinyl alcohols, esters and amides of styrene-maleic anhydride copolymers, and, in general, any of a wide number of water-soluble, high molecular weight polymers which enhance the viscosity of aqueous fluids. Teachings with respect to such polymers are found in U.S. Pat. Nos. 2,731,414; 2,827,964; 2,842,492; 3,018,826; 3,039,529; 3,079,337; 3,085,063; 3,679,000 and 3,744,566. The preferred mobility control agents are partially hydrolyzed polyacrylamides and copolymers of acrylamide and 2-acrylamido methylpropane sulfonic acid.

Suitable dialdehydes include water-soluble dialdehydes of the formula:

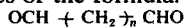

wherein "$n$" equals 0 to 3. The preferred dialdehyde, however, is glyoxal.

In carrying out the process of this invention, the dialdehyde may be incorporated into the aqueous injection fluid in any convenient manner. For example, the polymer solution and the dialdehyde may be mixed prior to injection or they may be metered and added concurrently with the injection of the flooding medium. The amounts used may vary from about 0.1 to about 1.0 and, preferably, from about 0.5 to about 1.5 moles of dialdehyde per mole of amide constituent of the polymer, and the polymer flooding medium can contain from about 0.0025 to about 0.5 percent by weight polymer and, preferably, from about 0.005 to about 0.15 percent by weight. Oxygen can be removed from the solution, if desired, by mechanical means such as vacuum deaeration or counter-current gas stripping or by chemical means such as the addition of an oxygen scavenger such as sodium sulfite or hydrazine.

The following examples illustrate the viscosity improving properties of the process of this invention.

EXAMPLE 1

Polymer solutions were prepared by dissolving 600 mg. of polymer in a liter of fresh water. After mixing, the viscosity of the polymer solutions was measured with a Brookfield Model LVT with U.L. Adapter at 3, 6, 12, 30 and 60 rpm. Part of each polymer solution was stored at room temperature and oxygen was bubbled through the solution twice a day for 45 days. Another portion of the polymer solution was capped in a bottle and placed in an oven at 205°F., the sample cooled to room temperature and the viscosity measured.

The following tables set forth the viscosity data for a partially hydrolyzed (17%), high molecular weight polyacrylamide (Table I) and a high molecular weight copolymer of 85 weight percent acrylamide and 15 weight percent 2-acrylamido methylpropane sulfonic acid (Table II).

Table I

| | Oxygen Present in Mix Water | |
|---|---|---|
| No Additive RPM | Initial Polymer Solution Viscosity, cp | Polymer Solution Heated 5 Days Viscosity, cp |
| 3 | 9.0 | 3.4 |
| 6 | 7.8 | 3.2 |
| 12 | 6.8 | 3.0 |
| 30 | 5.88 | 2.86 |
| 60 | 5.18 | 2.79 |

| | 60 ppm Glyoxal | | 660 ppm Glyoxal | |
|---|---|---|---|---|
| RPM | Not Heated | Heated 5 Days | Not Heated | Heated 5 Days |
| 3 | 8.0 | 4.8 | 9.4 | 7.6 |
| 6 | 6.9 | 4.3 | 8.4 | 6.8 |
| 12 | 6.4 | 4.15 | 8.0 | 6.7 |
| 30 | 5.44 | 3.86 | 6.68 | 6.22 |
| 60 | 4.83 | 3.69 | 5.88 | 5.79 |

Oxygen Removed from Solutions

Table I-continued

Oxygen Present in Mix Water

| No Additive RPM | Initial Polymer Solution Viscosity, cp | Polymer Solution Heated 5 Days Viscosity, cp |
|---|---|---|

| RPM | 100 ppm Glyoxal Heated 6 Days | 200 ppm Glyoxal Heated 3 Days | 400 ppm Glyoxal Heated 6 Days | 400 ppm Glyoxal Heated 14 Days |
|---|---|---|---|---|
| 3 | 15.6 | 15.6 | 15.6 | 11.0 |
| 6 | 14.2 | 13.7 | 14.8 | 10.3 |
| 12 | 12.5 | 12.4 | 13.1 | 9.35 |
| 30 | 10.04 | 10.00 | 10.44 | 7.98 |
| 60 | 8.38 | 8.35 | 8.69 | 6.89 |

Table II

Oxygen Present in Mix Water

| No Additive RPM | Initial Polymer Solution Viscosity, cp | Polymer Solution Heated 3 Days Viscosity, cp | Polymer Solution Heated 5 Days Viscosity, cp |
|---|---|---|---|
| 3 | 7.4 | 3.0 | 2.0 |
| 6 | 6.5 | 2.7 | 1.9 |
| 12 | 6.15 | 2.55 | 1.75 |
| 30 | 5.24 | 2.32 | 1.68 |
| 60 | 4.61 | 2.32 | 1.61 |

| RPM | 60 ppm Glyoxal Not Heated | 60 ppm Glyoxal Heated 5 Days | 660 ppm Glyoxal Not Heated | 660 ppm Glyoxal Heated 5 Days |
|---|---|---|---|---|
| 3 | 7.8 | 3 | 8.6 | 11.0 |
| 6 | 6.6 | 2.9 | 8.1 | 10.3 |
| 12 | 6.05 | 2.8 | 7.4 | 9.8 |
| 30 | 5.14 | 2.64 | 6.34 | 8.30 |
| 60 | 4.52 | 2.64 | 5.52 | 7.17 |

Oxygen Removed from Solutions

| RPM | 100 ppm Glyoxal Heated 6 Days | 200 ppm Glyoxal Heated 14 Days | 200 ppm Glyoxal Heated 30 Days | 400 ppm Glyoxal Heated 14 Days | 400 ppm Glyoxal Heated 30 Days |
|---|---|---|---|---|---|
| 3 | 12.6 | 12.7 | 15.4 | 9.0 | 10.6 |
| 6 | 11.3 | 11.6 | 13.7 | 8.5 | 9.7 |
| 12 | 10.05 | 10.3 | 12.1 | 7.85 | 8.8 |
| 30 | 8.22 | 8.36 | 9.62 | 6.64 | 7.42 |
| 60 | 6.84 | 6.99 | 7.98 | 5.72 | 6.37 |

The following example illustrates the improvements obtained when a core test is run with the compositions of this invention.

EXAMPLE 2

A 1-inch sandstone core plug was saturated with fresh water and permeability-to-water measured 265 md. A 600 mg/l Polymer 454 dissolved in fresh water was injected through the core plug and the stabilized resistance factor was determined at room temperature.

Another 600 mg/l Polymer 454 solution in fresh water was purged with nitrogen, treated with 200 ppm glyoxal, and heated for 6 days at 205°F. The solution was cooled to room temperature and then injected through the same 1-inch core plug. These results indicate the higher viscosity glyoxal-treated sample did not result in plugging of the core plug.

1 inch Sandstone Core Plugs
Permeability to Fresh Water      $K_w = 265$ md.
600 mg/l Polymer 454 in Fresh Water      $R_p = 3.5$
600 mg/l Polymer 454 with 200 ppm
Glyoxal Through the Same Plug      $R_p = 3.4$

We claim:

1. A process for the secondary or tertiary recovery of petroleum from subterranean formations penetrated by an injection well and a producing well which comprises introducing into said reservoir through said injection well a substantially oxygen free displacing medium comprising water, a high molecular weight water-soluble polymer selected from the group consisting of partially hydrolyzed polyacrylamide and copolymers of acrylamide and 2-acrylamido methylpropane sulfonic acid and from about 0.1 to about 10 moles of glyoxal per mole of amide constituent of said polymer in order to increase the solution viscosity of said displacing medium.

2. A process as in claim 1 wherein the polymer solution and glyoxal are mixed prior to injection thereof.

3. A process as in claim 1 wherein the polymer and glyoxal are added concurrently to the system.

* * * * *

UNITED STATES PATENT OFFICE
CERTIFICATE OF CORRECTION

PATENT NO. : 3,953,342
DATED : April 27, 1976
INVENTOR(S) : Fred David Martin and Lawrence James Guilbault It is certified that error appears in the above-identified patent and that said Letters Patent are hereby corrected as shown below:

Column 3, lines 2 through 5 (the first heading) should be deleted.

Column 3, Line 10, fourth column "15.6" should read -- 16.6 --.

Signed and Sealed this

Sixth Day of July 1976

[SEAL]

Attest:

RUTH C. MASON
*Attesting Officer*

C. MARSHALL DANN
*Commissioner of Patents and Trademarks*